US012737838B2

(12) United States Patent
Cetinkaya et al.

(10) Patent No.: US 12,737,838 B2
(45) Date of Patent: Sep. 15, 2026

(54) LIGHTWEIGHT DENSE RESIDUAL NETWORK FOR VIDEO SUPER-RESOLUTION ON MOBILE DEVICES

(71) Applicant: Bitmovin GmbH, Klagenfurt am Wörthersee (AT)

(72) Inventors: Ekrem Cetinkaya, Klagenfurt am Wörthersee (AT); Minh Nguyen, Klagenfurt am Wörthersee (AT); Christian Timmerer, Klagenfurt am Wörthersee (AT)

(73) Assignee: Bitmovin GmbH, Klagenfurt am Wörthersee (AT)

( * ) Notice: Subject to any disclaimer, the term of this patent is extended or adjusted under 35 U.S.C. 154(b) by 395 days.

(21) Appl. No.: 18/209,666

(22) Filed: Jun. 14, 2023

(65) Prior Publication Data

US 2023/0419447 A1 Dec. 28, 2023

Related U.S. Application Data

(60) Provisional application No. 63/354,786, filed on Jun. 23, 2022.

(51) Int. Cl.

*G06K 9/00* (2022.01)
*G06T 3/4046* (2024.01)
*G06T 3/4053* (2024.01)

(52) U.S. Cl.

CPC .......... *G06T 3/4046* (2013.01); *G06T 3/4053* (2013.01)

(58) Field of Classification Search

CPC ............................ G06T 3/4046; G06T 3/4053
See application file for complete search history.

(56) References Cited

U.S. PATENT DOCUMENTS

| | | | | |
|---|---|---|---|---|
| 2022/0036552 | A1* | 2/2022 | He | G06T 7/11 |
| 2022/0261960 | A1* | 8/2022 | Wang | G06T 3/4053 |
| 2022/0405882 | A1* | 12/2022 | Ferrés | G06T 3/4046 |
| 2023/0153946 | A1* | 5/2023 | Fu | G06T 3/4053 382/254 |

OTHER PUBLICATIONS

Zhang, Yulun, et al. "Residual dense network for image super-resolution." Proceedings of the IEEE conference on computer vision and pattern recognition. 2018. (Year: 2018).*

(Continued)

*Primary Examiner* — Avinash Yentrapati
(74) *Attorney, Agent, or Firm* — Marton Ribera Schumann & Chang LLP; Chien-Ju Alice Chuang

(57) ABSTRACT

The technology described herein relates to a lightweight dense residual network for video super-resolution on mobile devices. A method for implementing a lightweight dense residual network to achieve super-resolution performance may include generating feature maps using a network based on an input of frames at a lower resolution, the network comprised of DenseRes blocks and an additional convolution operation, each DenseRes block comprising multiple layers of convolution operations and rectified linear activation function (ReLU) operations and a 1×1 convolution operation. Said feature maps are upsampled by a pixel shuffle layer in the network and the frames are output at a higher resolution, the higher resolution relative to the lower resolution by an upscaling factor.

9 Claims, 4 Drawing Sheets

(56) References Cited

OTHER PUBLICATIONS

Purohit, Kuldeep, Srimanta Mandal, and A. N. Rajagopalan. "Scale-recurrent multi-residual dense network for image super-resolution." Proceedings of the European Conference on Computer Vision (ECCV) Workshops. 2018. (Year: 2018).*

Ayazoglu, Mustafa. "Extremely lightweight quantization robust real-time single-image super resolution for mobile devices." Proceedings of the IEEE/CVF conference on computer vision and pattern recognition. 2021. (Year: 2021).*

* cited by examiner

LIGHTWEIGHT DENSE RESIDUAL NETWORK FOR VIDEO SUPER-RESOLUTION ON MOBILE DEVICES

CROSS-REFERENCE TO RELATED APPLICATIONS

This application claims priority to U.S. Patent Application No. 63/354,786 entitled "Lightweight Dense Residual Network for Video Super-Resolution on Mobile Devices," filed Jun. 23, 2022, the contents of which are hereby incorporated by reference in their entirety.

BACKGROUND OF INVENTION

Video is now an essential part of the Internet. A growing component of this is the increasing popularity of video streaming on mobile devices and the improvement in mobile displays. This fact has, in turn, created demand pressure to provide high quality video to such devices via mobile networks. In particular, improving the user experience for video streaming on mobile devices has become a hot topic in recent years. Moreover, with more devices supporting improved display technologies such as High Dynamic Range (HDR) and increased resolution of smartphone screens (e.g., UHD), providing visually pleasing videos to mobile devices has become even more important.

Advancements in deep neural networks have seen successful applications on several computer vision tasks such as super-resolution (SR). Deep neural networks have been successfully used in numerous computer vision applications in recent years. Super-resolution (SR) is one of the aforementioned computer vision applications. Super-resolution can be defined as the task of increasing the spatial resolution of an image using computational processing while maintaining the visual quality as much as possible. Traditional methods like bicubic or bilinear interpolation produce artifacts during the SR process. DNN based SR approaches have proved to provide better results over conventional techniques, and the research in this area has gained momentum in recent years. HTTP Adaptive Streaming (HAS) is a predominant technology for video delivery. In HAS, a video at the server is encoded at different quality levels, each of which is represented by a pair of bitrate and resolution. Quality levels are then chopped into temporal segments with a fix-duration, e.g., 2 s, 4 s, or 10 s. The client hosts an adaptive bitrate (ABR) algorithm to select the most suitable quality level for each segment based on resources such as available throughput, battery level, and buffer occupancy. Due to the time-varying throughput, the client usually suffers from quality changes and rebuffering events, when the video is stopped because of buffer drain. This challenge might be solved by SR technique, where the client downloads low-quality segments to prevent rebuffering, then enhance their quality with SR approaches. However, the execution speed is crucial as the video must be processed in real-time in the context of HAS.

However, although DNN-based SR methods significantly improve over traditional methods, their computational complexity makes them challenging to apply on devices with limited power, such as smartphones. Despite achieving impressive improvements over traditional approaches, the computational complexity of DNN based solutions made them challenging, sometimes even not feasible, to apply on commodity mobile devices for a long time. Improvements in smartphone hardware, such as the rapid advancement of mobile GPUs, has made it possible to execute complex DNN based solutions in real-time in recent years. Moreover, with the development of mobile DNN frameworks like Tensorflow-lite and Pytorch Mobile, it has become easier to develop DNN based solutions for smartphones.

Conventional examples include super-resolution convolutional neural networks (SRCNN), wherein the input image is upscaled by bicubic interpolation first, and the high-resolution image is enhanced using convolution layers. Fast super-resolution convolutional neural networks (FSRCNN) are similar to SRCNN with structural changes that address the computational complexity of SRCNN. A video super-resolution convolutional neural network (VSRCNN) trains a convolutional neural network with both spatial and temporal features, using motion-compensated frames as input to the super-resolution network. A very deep convolutional neural network has been proposed, using residual learning, high learning rate, and gradient clipping to overcome slow convergence issues with deep networks.

Other works have proposed a deep recursive residual network (DRRN) that utilizes both global and local residual connections to overcome the training problem of very deep networks, as well as recursive learning to increase the depth of the model in a controlled manner.

A sub-pixel convolution layer that learns interpolation method implicitly also has been used as an upscaling operation, enabling an efficient sub-pixel convolutional neural network (ESPCN) to perform feature extraction steps in low-resolution space, reducing the memory requirement. ESPCN also has been combined with a motion-estimation module to exploit temporal redundancies for real-time video super-resolution.

Deep residual networks (EDSR) and cascading residual networks (CARN) using a ResNet structure in intermediate layers also have been proposed. In a CARN, cascading information flow mechanism is implemented on top of residual connections, which enables the utilization of information from different layers at both local and global levels.

Other conventional solutions include efficient video super-resolution network (EVSRNet) using neural architecture search (NAS) to find the most efficient settings; a residual dense network (RDN) for image super-resolution where residual dense blocks are used in the structure can connect features from preceding blocks to layers of the current block; SRDenseNet, where feature maps of each layer are propagated into all upcoming layers to combine low-level features and high-level features; compressing super-resolution networks for heterogeneous mobile devices; using neural architecture and pruning search to automatically find optimized SR block configuration in each cell and pruning configuration in each layer.

However, all of these conventional techniques remain impractical for application in today's mobile devices due to relatively high computational cost and complexity. Thus, it is desirable to implement a lightweight dense residual network for video super-resolution on mobile devices.

BRIEF SUMMARY

The present disclosure provides for techniques relating to a lightweight dense residual network for video super-resolution on mobile devices. A method for implementing a lightweight dense residual network to achieve super-resolution performance may include: receiving an input comprising a number of frames at a lower resolution; generating a first output, by a network comprising two or more DenseRes blocks and an additional convolution operation, each DenseRes block comprising two or more layers, each of the two or more layers comprising a convolution operation and a rectified linear activation function (ReLU) operation, and a 1×1 convolution operation, the first output comprising a plurality of feature maps; upsampling the first output by a pixel shuffle layer in the network; and generating a second output comprising the number of frames at a higher resolution, the higher resolution relative to the lower resolution by an upscaling factor.

In some examples, the network comprises an additional ReLU operation clipped to have a maximum value of 1, the additional ReLU operation implemented before the pixel shuffle layer. In some examples, the network is configured to run in real-time on a mobile device. In some examples, the second output provides for video super-resolution on a mobile device. In some examples, the network is configured to process ten or more frames concurrently. In some examples, the ten or more frames comprises every sixth frame in 60 FPS video. In some examples, a residual connection from a previous layer of the two or more layers in the network propagates a feature map from the previous layer to one or more upcoming layers. In some examples, the 1×1 convolution operation is configured to extract a compressed feature map from two or more feature maps within a DenseRes block.

BRIEF DESCRIPTION OF THE DRAWINGS

Various non-limiting and non-exhaustive aspects and features of the present disclosure are described hereinbelow with references to the drawings, wherein.

Like reference numbers and designations in the various drawings indicate like elements. Skilled artisans will appreciate that elements in the Figures are illustrated for simplicity and clarity, and have not necessarily been drawn to scale, for example, with the dimensions of some of the elements in the figures exaggerated relative to other elements to help to improve understanding of various embodiments. Common, well-understood elements that are useful or necessary in a commercially feasible embodiment are often not depicted in order to facilitate a less obstructed view of these various embodiments.

DETAILED DESCRIPTION

The invention is directed to a lightweight dense residual network for video super-resolution ("LiDeR") on mobile devices. LiDeR comprises a lightweight video super-resolution network (e.g., cascading neural network) trained to address real-time video super-resolution challenges on mobile devices. LiDeR is designed to be used in HAS to improve the visual quality of videos, aiming to reduce visual artifacts on the input video while increasing the resolution. Moreover, LiDeR works on decoded videos in real-time without any hardware-specific optimization; thus, it can work with any video codec, contrary to existing super-resolution (SR)-based solutions for HAS.

LiDeR takes N (i.e., a given number of) frames with resolutions W×H and produces N frames with resolutions U*W×U*H where U is the upscaling factor. Each frame may be processed with the same layers in parallel. N can conveniently be selected to be 10 in some examples, meaning that LiDeR processes 10 frames at once. In other examples, N can be more or less than 10 (e.g., 1<N<Frames per Second (FPS) in the video or 1<N<30).

Figure 1:
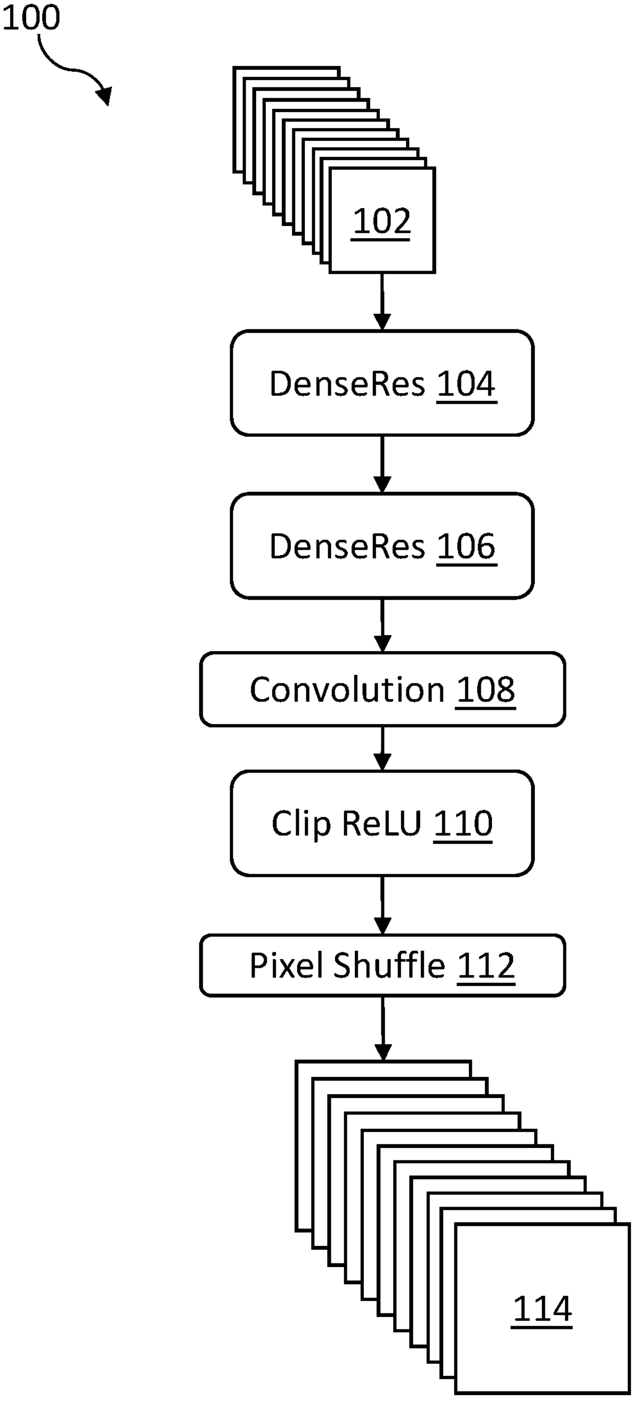
FIG. 1 is a simplified block diagram of an exemplary lightweight dense residual network for video super-resolution on mobile devices, in accordance with one or more embodiments.

FIG. 1 is a simplified block diagram of an exemplary lightweight dense residual network for video super-resolution on mobile devices, in accordance with one or more embodiments. Network 100 consists of DenseRes blocks 104 and 106 (e.g., a combination Dense network and Residual network, such as DenseRes block 200 in FIG. 2) followed by a convolution operation 108 configured to prepare feature maps for a pixel shuffle layer 112, which may be applied at or towards the end to upscale the input to the target resolution. DenseRes block 104 may be configured to receive input 102 comprising N frames with a given resolution. A rectified linear activation function (ReLU) operation 110 may be clipped (e.g., to have a maximum value of 1) to preserve the performance while quantizing the network for mobile devices. Network 100 may be configured to output a set of N frames with higher resolution U*W×U*H according to upscaling factor U.

Figure 2:
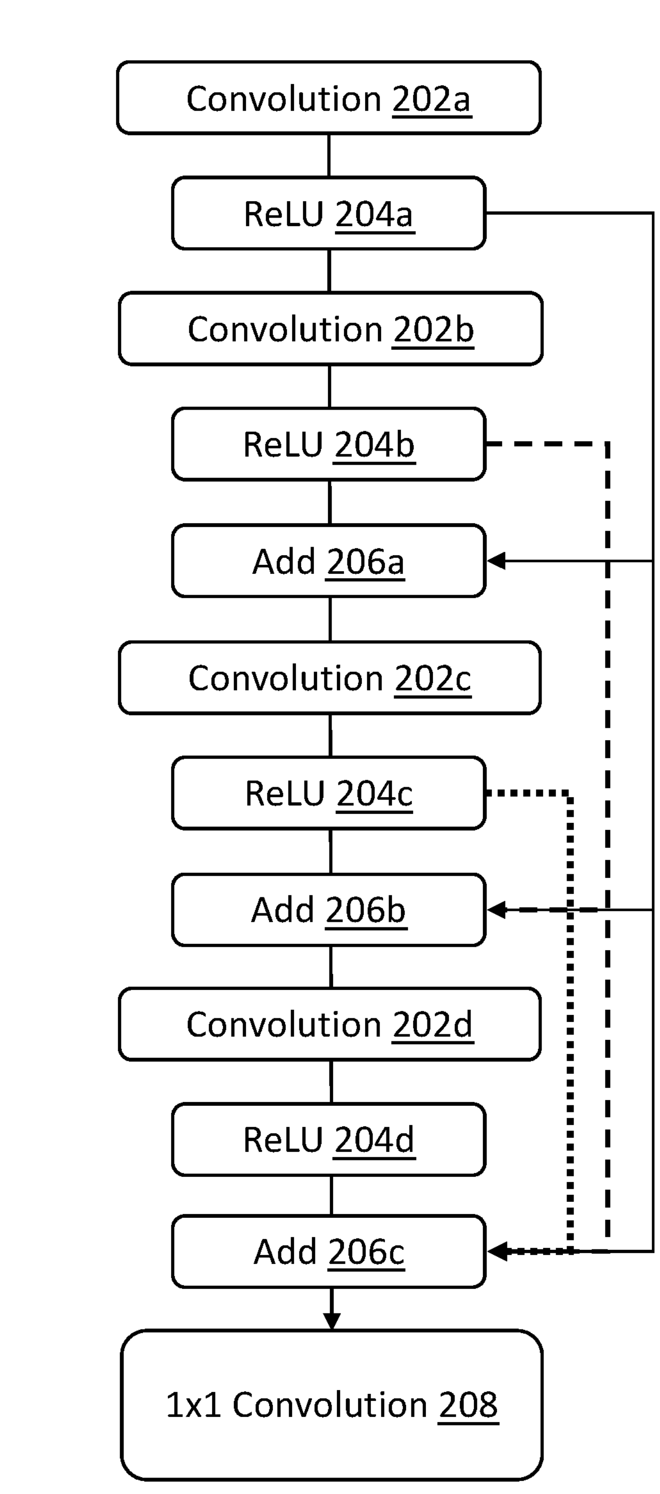
FIG. 2 is a simplified block diagram of an exemplary DenseRes block, in accordance with one or more embodiments.

FIG. 2 is a simplified block diagram of an exemplary DenseRes block, in accordance with one or more embodiments. Each DenseRes block (e.g., blocks 104 and 106 from FIG. 1) may include several convolutions and ReLU operations. For example, DenseRes block 200 includes convolutions 202*a-d* and ReLU operations 204*a-c*. In DenseRes block 200, residual connections may be used in any layer following the first layer (e.g., solid, dashed, and dotted lines from ReLUs 204*a-d* to Adds 206*a-c* represent residual connections). These connections propagate (e.g., add) the feature maps from previous layers to some or all upcoming layers to effectively combine features. Moreover, the 1×1 convolution operation 208 may be applied at the end of block 200 to combine all the previous information within the block and extract a compressed feature map. This repetitive usage of previous feature maps in the network enables improved utilization of information using fewer layers, and thus the ability to run the network in real-time on mobile devices. DenseRes block 200 differ may be configured to add together feature maps, rather than concatenating them like in conventional techniques (e.g., SRDenseNet structure).

A LiDeR, as described herein, can process up to ten (10) or more frames concurrently (e.g., all at once or almost simultaneously). The frames can be selected in different ways (e.g., choosing every sixth frame in 60 FPS video, or every second frame, third frame, fourth frame, fifth frame, all frames or other samplings of frames) as long as the temporal difference between frames is not too high.

Experimental results show that LiDeR can achieve competitive SR performance with state-of-the-art networks while improving the execution speed significantly (e.g., 267% for X4 upscaling and 353% for X2 upscaling compared to ESPCN).

In some examples, depending on the mobile device capabilities, an end user can request lower resolution representations from a server and apply super-resolution at the client in real-time using LiDeR. Thus, network bandwidth may be saved (e.g., as less data is transferred) which may reduce costs for a service provider.

Figure 3:
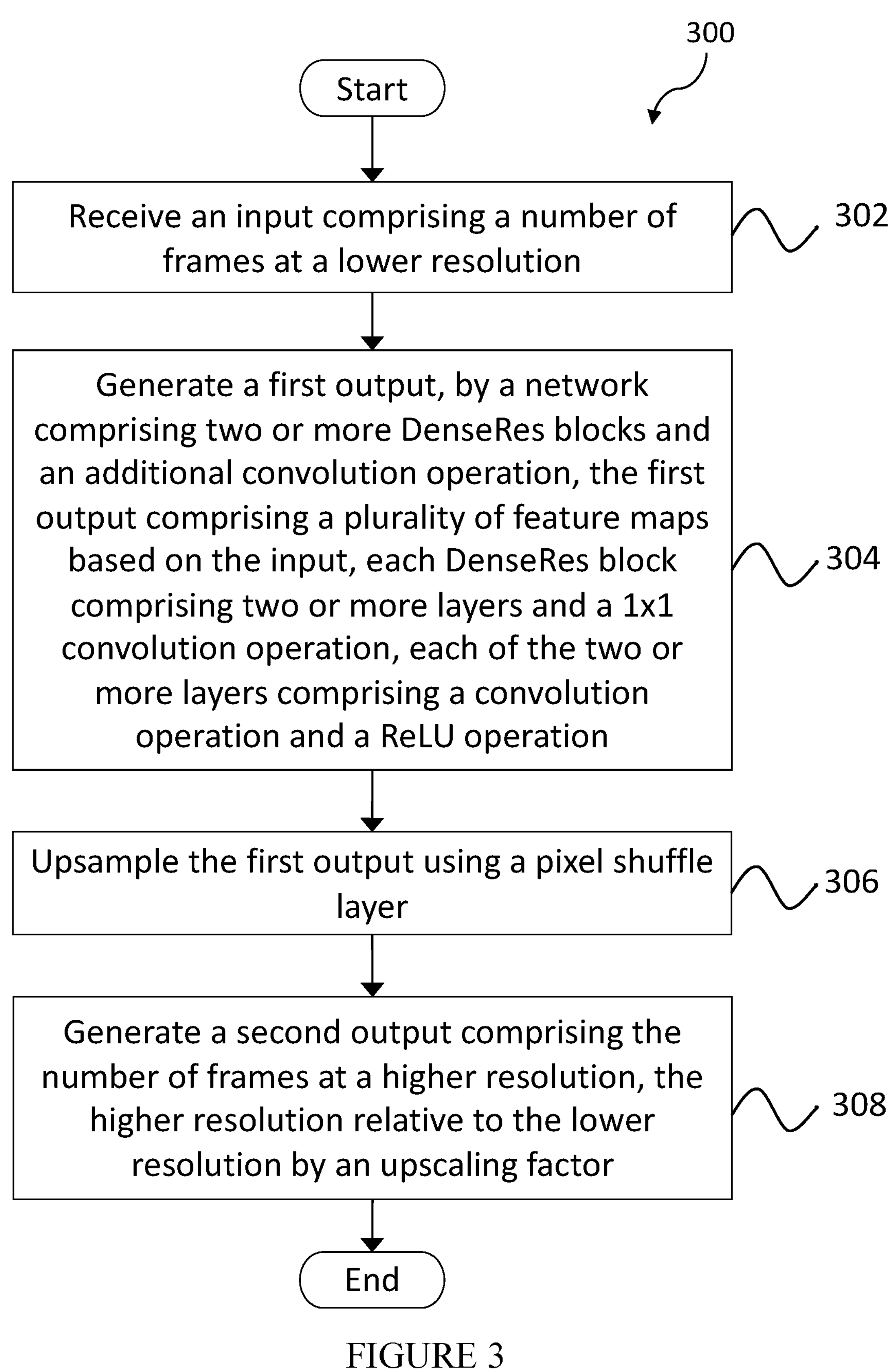
FIG. 3 is a flow diagram illustrating an exemplary method for implementing a lightweight dense residual network to achieve super-resolution performance, in accordance with one or more embodiments.

FIG. 3 is a flow diagram illustrating an exemplary method for implementing a lightweight dense residual network to achieve super-resolution performance, in accordance with one or more embodiments. Method 300 may begin with receiving an input comprising a number of frames at a lower resolution at step 302. A first output may be generated by a network at step 304, the first output comprising a plurality of feature maps based on the input. The network may comprise two or more DenseRes blocks (e.g., DenseRes blocks 104 and 106 in FIG. 1) and an additional convolution operation (e.g., convolution 108 in FIG. 1). Each DenseRes block may comprise two or more layers and a 1×1 convolution operation (e.g., 1×1 convolution 208 in FIG. 2), each of the two or more layers comprising a convolution operation (e.g., convolutions 202*a-d* in FIG. 2) and a ReLU operation (e.g., ReLUs 204*a-c* in FIG. 2). The first output may be upsampled using a pixel shuffle layer (e.g., pixel shuffle 112 in FIG. 1) at step 306. In some examples, an additional ReLU operation (e.g., clipped to have a maximum value of 1) may be implemented before the pixel shuffle layer to preserve performance while quantizing the network for mobile devices. A second output may be generated by the pixel shuffle layer at step 308, the second output comprising the number of frames at a higher resolution. As described herein, the higher resolution is relative to the lower resolution by an upscaling factor (e.g., where the lower resolution is W×H, the higher resolution may be U*W×U*H where U is the upscaling factor).

Figure 4A:
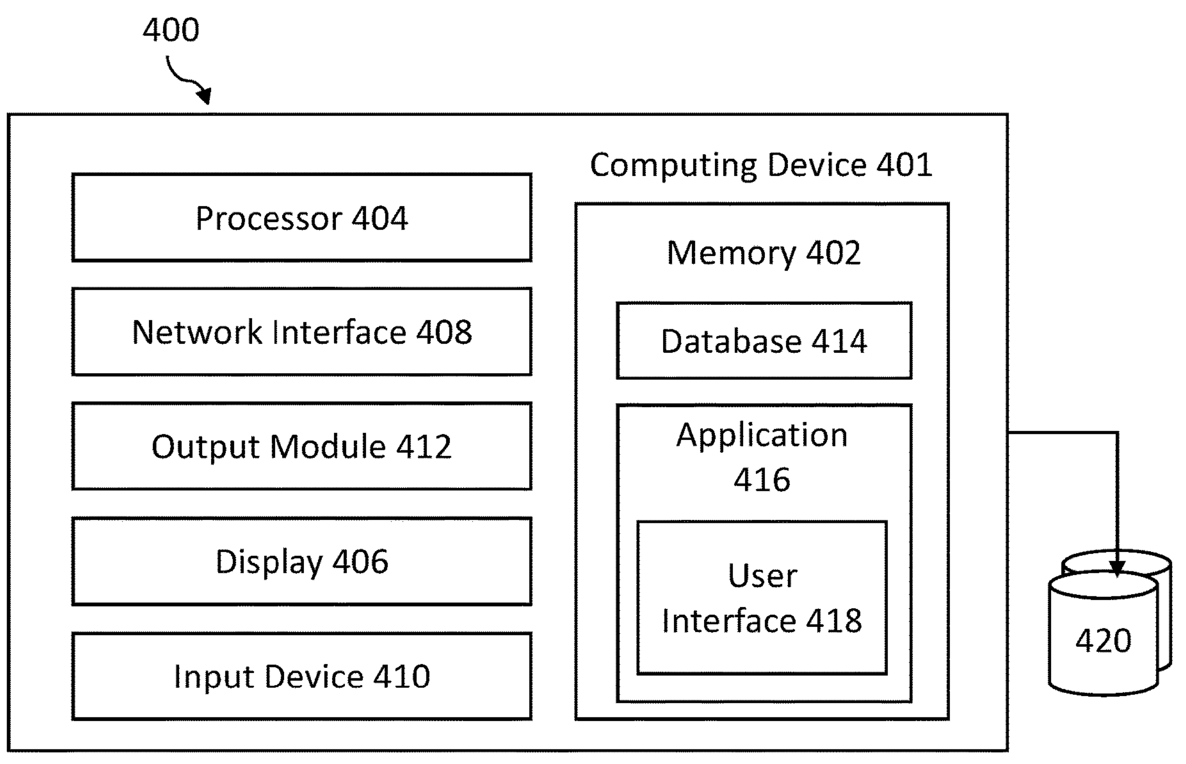
FIG. 4A is a simplified block diagram of an exemplary computing system configured to perform steps of the method illustrated in FIG. 3 and to implement the networks illustrated in FIGS. 1-2, in accordance with one or more embodiments.

FIG. 4A is a simplified block diagram of an exemplary computing system configured to perform steps of the method illustrated in FIG. 3 and to implement the networks illustrated in FIGS. 1-2, in accordance with one or more embodiments. In one embodiment, computing system 400 may include computing device 401 and storage system 420. Storage system 420 may comprise a plurality of repositories and/or other forms of data storage, and it also may be in communication with computing device 401. In another embodiment, storage system 420, which may comprise a plurality of repositories, may be housed in one or more of computing device 401. In some examples, storage system 420 may store video data (e.g., frames, resolutions, and the like), neural networks (e.g., trained), feature maps, instructions, programs, and other various types of information as described herein. This information may be retrieved or otherwise accessed by one or more computing devices, such as computing device 401, in order to perform some or all of the features described herein. Storage system 420 may comprise any type of computer storage, such as a hard-drive, memory card, ROM, RAM, DVD, CD-ROM, write-capable, and read-only memories. In addition, storage system 420 may include a distributed storage system where data is stored on a plurality of different storage devices, which may be physically located at the same or different geographic locations (e.g., in a distributed computing system such as system 450 in FIG. 4B). Storage system 420 may be networked to computing device 401 directly using wired connections and/or wireless connections. Such network may include various configurations and protocols, including short range communication protocols such as Bluetooth™, Bluetooth™ LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

Computing device 401 also may include a memory 402. Memory 402 may comprise a storage system configured to store a database 414 and an application 416. Application 416 may include instructions which, when executed by a processor 404, cause computing device 401 to perform various steps and/or functions, as described herein. Application 416 further includes instructions for generating a user interface 418 (e.g., graphical user interface (GUI)). Database 414 may store various algorithms and/or data, including neural networks and data regarding video data and feature maps, among other types of data. Memory 402 may include any non-transitory computer-readable storage medium for storing data and/or software that is executable by processor 404, and/or any other medium which may be used to store information that may be accessed by processor 404 to control the operation of computing device 401.

Computing device 401 may further include a display 406, a network interface 408, an input device 410, and/or an output module 412. Display 406 may be any display device by means of which computing device 401 may output and/or display data. Network interface 408 may be configured to connect to a network using any of the wired and wireless short range communication protocols described above, as well as a cellular data network, a satellite network, free space optical network and/or the Internet. Input device 410 may be a mouse, keyboard, touch screen, voice interface, and/or any or other hand-held controller or device or interface by means of which a user may interact with computing device 401. Output module 412 may be a bus, port, and/or other interface by means of which computing device 401 may connect to and/or output data to other devices and/or peripherals.

In one embodiment, computing device 401 is a data center or other control facility (e.g., configured to run a distributed computing system as described herein), and may communicate with a media playback device. As described herein, system 400, and particularly computing device 401, may be used for implementing LiDeR techniques for video super-resolution on mobile devices, as described herein. Various configurations of system 400 are envisioned, and various steps and/or functions of the processes described herein may be shared among the various devices of system 400 or may be assigned to specific devices.

Figure 4B:
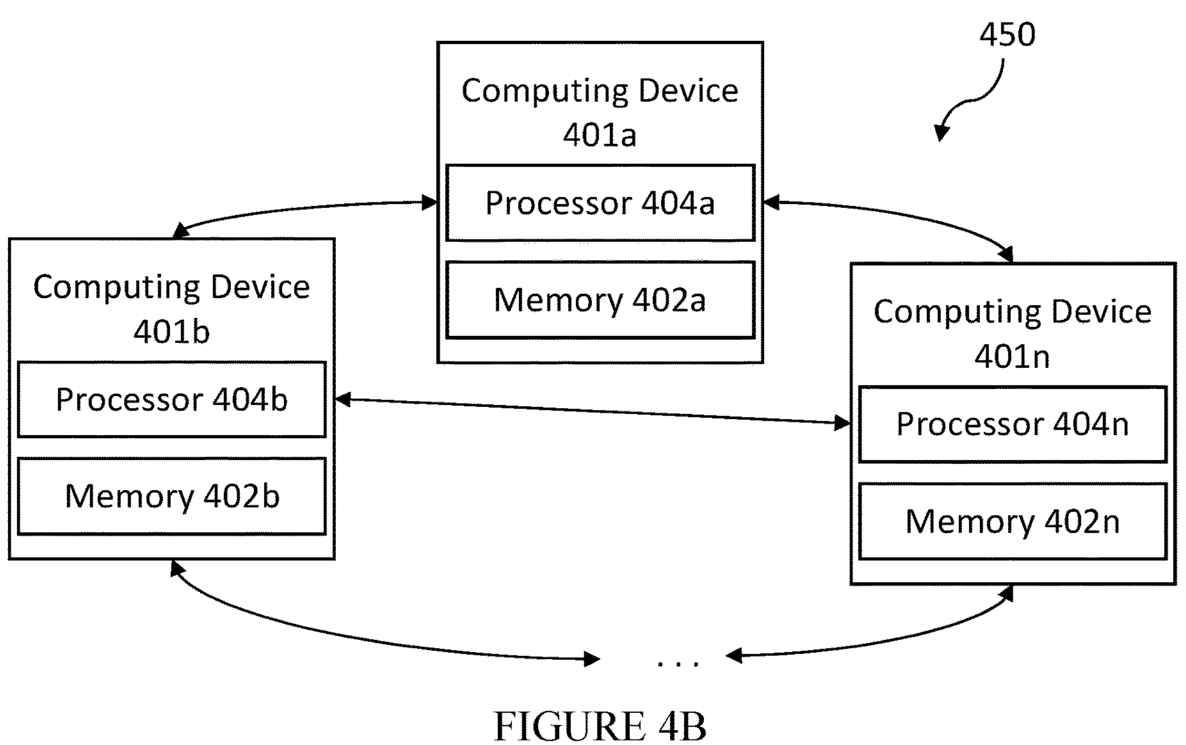
FIG. 4B is a simplified block diagram of an exemplary distributed computing system implemented by a plurality of the computing devices, in accordance with one or more embodiments.

FIG. 4B is a simplified block diagram of an exemplary distributed computing system implemented by a plurality of the computing devices, in accordance with one or more embodiments. System 450 may comprise two or more computing devices 401*a-n*. In some examples, each of 401*a-n* may comprise one or more of processors 404*a-n*, respectively, and one or more of memory 402*a-n*, respectively. Processors 404*a-n* may function similarly to processor 404 in FIG. 4A, as described above. Memory 402*a-n* may function similarly to memory 402 in FIG. 4A, as described above.

In an example, Tensorflow-lite may be used as a deep learning library in the systems and methods described herein. Example networks may be quantized with float16 quantization, or the like, and TF-Lite GPU delegate used to speed up execution on a smartphone.

The LiDeR techniques described herein can run in real-time with large input sizes (e.g., 360p or greater) on commodity mobile devices while maintaining competitive SR performance compared to conventional networks. While running in real-time (e.g., >60 FPS) on a variety of typical mobile devices, LiDeR can increase execution speeds up to and more than 400% compared to, while maintaining quality at, above, or just below the quality of, prior art techniques.

While specific examples have been provided above, it is understood that the present invention can be applied with a wide variety of inputs, thresholds, ranges, and other factors, depending on the application. For example, the time frames, rates, ratios, and ranges provided above are illustrative, but one of ordinary skill in the art would understand that these time frames and ranges may be varied or even be dynamic and variable, depending on the implementation.

As those skilled in the art will understand a number of variations may be made in the disclosed embodiments, all without departing from the scope of the invention, which is defined solely by the appended claims. It should be noted that although the features and elements are described in particular combinations, each feature or element can be used alone without other features and elements or in various combinations with or without other features and elements. The methods or flow charts provided may be implemented in a computer program, software, or firmware tangibly embodied in a computer-readable storage medium for execution by a general-purpose computer or processor.

Examples of computer-readable storage mediums include a read only memory (ROM), random-access memory (RAM), a register, cache memory, semiconductor memory devices, magnetic media such as internal hard disks and removable disks, magneto-optical media, and optical media such as CD-ROM disks.

Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, or any combination of thereof.

What is claimed is:

1. A method for implementing a lightweight dense residual network to achieve super-resolution performance, comprising:

receiving a video input comprising a number of frames at a lower resolution;

generating a first output in real-time on a mobile device, by a network comprising two or more DenseRes blocks and a 1×1 convolution operation, each DenseRes block comprising two or more layers, the two or more layers comprising a convolution operation, a rectified linear activation function (ReLU) operation, and an additional convolution operation, each DenseRes block configured to add a feature map from a previous layer to an upcoming layer without concatenation, the first output comprising a plurality of feature maps;

upsampling the first output by a pixel shuffle layer in the network; and generating a second output comprising the number of frames at a higher resolution, the higher resolution relative to the lower resolution by an upscaling factor.

2. The method of claim 1, wherein the network comprises an additional ReLU operation clipped to have a maximum value of 1, the additional ReLU operation implemented before the pixel shuffle layer.

3. The method of claim 1, wherein the network is configured to run in real-time on a mobile device.

4. The method of claim 1, wherein the second output provides for video super-resolution on a mobile device.

5. The method of claim 1, wherein the network is configured to process ten or more frames concurrently.

6. The method of claim 5, wherein the ten or more frames comprises every sixth frame in 60 FPS video.

7. The method of claim 1, wherein a residual connection from the previous layer propagates a feature map from the previous layer to one or more upcoming layers.

8. The method of claim 1, further comprising extracting a compressed feature map, by the 1×1 convolution operation, from two or more feature maps within a DenseRes block.

9. A non-transitory computer-readable medium storing computer instructions for scalable per-title encoding that when executed on one or more computer processors perform the steps of:

receiving a video input comprising a number of frames at a lower resolution;

generating a first output, by a network comprising two or more DenseRes blocks and a 1×1 convolution operation, each DenseRes block comprising two or more layers, each of the two or more layers comprising a convolution operation, a rectified linear activation function (ReLU) operation, and an additional convolution operation, each DenseRes block configured to add a feature map from a previous layer to an upcoming layer without concatenation, the first output comprising a plurality of feature maps;

upsampling the first output by a pixel shuffle layer in the network; and generating a second output comprising the number of frames at a higher resolution, the higher resolution relative to the lower resolution by an upscaling factor.

* * * * *